(12) United States Patent
Sang et al.

(10) Patent No.: US 11,565,825 B2
(45) Date of Patent: Jan. 31, 2023

(54) SURFACING MATERIALS FOR COMPOSITE STRUCTURES

(71) Applicant: CYTEC INDUSTRIES INC., Princeton, NJ (US)

(72) Inventors: Junjie Jeffrey Sang, Newark, DE (US); Dalip Kumar Kohli, Churchville, MD (US); Kevin R. Mullery, Newark, DE (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 93 days.

(21) Appl. No.: 17/306,581

(22) Filed: May 3, 2021

(65) Prior Publication Data
US 2021/0253270 A1 Aug. 19, 2021

Related U.S. Application Data

(63) Continuation of application No. 15/778,035, filed as application No. PCT/US2016/064002 on Nov. 29, 2016, now Pat. No. 11,027,856.
(Continued)

(51) Int. Cl.
*B32B 5/24* (2006.01)
*B32B 5/28* (2006.01)
(Continued)

(52) U.S. Cl.
CPC ............... *B64D 45/02* (2013.01); *B32B 3/12* (2013.01); *B32B 3/266* (2013.01); *B32B 5/022* (2013.01); *B32B 5/024* (2013.01); *B32B 5/18* (2013.01); *B32B 5/245* (2013.01); *B32B 5/26* (2013.01); *B32B 7/12* (2013.01); *B32B 9/007* (2013.01);
(Continued)

(58) Field of Classification Search
CPC .. B32B 5/24; B32B 5/28; B32B 27/06; B32B 27/08; B32B 27/12; B32B 27/20; B32B 27/26; B32B 27/38; B32B 37/24; B32B 28/08; H05K 1/00; H05K 1/02; H05K 1/03; H05K 1/0014; H05K 1/185; H05K 3/007; H05K 3/0014; H05K 3/0373; H05K 3/4602; H05K 3/429; H05K 3/4626; G21F 1/00
USPC ......... 174/260, 250, 393; 428/9.7, 137, 212, 428/213, 458, 545, 546, 549; 156/60, 156/246
See application file for complete search history.

(56) References Cited

U.S. PATENT DOCUMENTS

| | | | | |
|---|---|---|---|---|
| 5,455,117 A * | 10/1995 | Nagano | ................ | H05K 9/0088 428/545 |
| 2013/0309512 A1* | 11/2013 | Fujimura | ............. | H05K 1/0296 428/458 |
| 2014/0363646 A1* | 12/2014 | Hayashi | ................ | H05K 3/007 156/60 |

* cited by examiner

*Primary Examiner* — Xiaoliang Chen
(74) *Attorney, Agent, or Firm* — Thi Dang

(57) ABSTRACT

Multifunctional surfacing materials for use in composite structures are disclosed. According to one embodiment, the surfacing material includes (a) a stiffening layer, (b) a curable resin layer, (c) a conductive layer, and (d) a nonwoven layer, wherein the stiffening layer (a) and the nonwoven layer (d) are outermost layers, and the exposed surfaces of the outermost layers are substantially tack-free at room temperature (20° C. to 25° C.). The conductive layer may be interposed between the curable resin layer and the stiffening layer or embedded in the curable resin layer. According to another embodiment, the surfacing material includes a fluid barrier film between two curable resin
(Continued)

layers. The surfacing materials may be in the form of a continuous or elongated tape that is suitable for automated placement.

17 Claims, 4 Drawing Sheets

Related U.S. Application Data

(60) Provisional application No. 62/260,824, filed on Nov. 30, 2015.

(51) Int. Cl.

| | |
|---|---|
| *B32B 27/06* | (2006.01) |
| *B32B 27/08* | (2006.01) |
| *B32B 27/12* | (2006.01) |
| *B32B 27/20* | (2006.01) |
| *B32B 27/26* | (2006.01) |
| *B32B 27/38* | (2006.01) |
| *B32B 37/24* | (2006.01) |
| *B32B 38/08* | (2006.01) |
| *H05K 1/00* | (2006.01) |
| *H05K 1/02* | (2006.01) |
| *H05K 1/03* | (2006.01) |
| *H05K 1/14* | (2006.01) |
| *H05K 3/07* | (2006.01) |
| *H05K 3/14* | (2006.01) |
| *G21F 1/00* | (2006.01) |
| *B64D 45/02* | (2006.01) |
| *B32B 5/02* | (2006.01) |
| *B32B 9/00* | (2006.01) |
| *B32B 9/04* | (2006.01) |
| *B32B 15/08* | (2006.01) |
| *B32B 15/20* | (2006.01) |
| *B32B 27/10* | (2006.01) |
| *B32B 27/36* | (2006.01) |
| *B32B 15/09* | (2006.01) |
| *B32B 7/12* | (2006.01) |
| *B32B 27/28* | (2006.01) |
| *B32B 21/08* | (2006.01) |
| *B32B 5/26* | (2006.01) |
| *B32B 15/088* | (2006.01) |
| *B32B 27/18* | (2006.01) |
| *B32B 29/02* | (2006.01) |
| *B32B 3/26* | (2006.01) |
| *B32B 5/18* | (2006.01) |
| *B32B 27/34* | (2006.01) |
| *B32B 15/14* | (2006.01) |
| *B32B 3/12* | (2006.01) |
| *B32B 21/10* | (2006.01) |
| *B64C 1/12* | (2006.01) |
| *B64C 3/20* | (2006.01) |

(52) U.S. Cl.
CPC .............. *B32B 9/045* (2013.01); *B32B 9/047* (2013.01); *B32B 15/08* (2013.01); *B32B 15/088* (2013.01); *B32B 15/09* (2013.01); *B32B 15/14* (2013.01); *B32B 15/20* (2013.01); *B32B 21/08* (2013.01); *B32B 21/10* (2013.01); *B32B 27/065* (2013.01); *B32B 27/10* (2013.01); *B32B 27/12* (2013.01); *B32B 27/18* (2013.01); *B32B 27/20* (2013.01); *B32B 27/26* (2013.01); *B32B 27/281* (2013.01); *B32B 27/285* (2013.01); *B32B 27/286* (2013.01); *B32B 27/288* (2013.01); *B32B 27/34* (2013.01); *B32B 27/36* (2013.01); *B32B 29/02* (2013.01); *B64C 1/12* (2013.01); *B64C 3/20* (2013.01); *B32B 2250/04* (2013.01); *B32B 2255/02* (2013.01); *B32B 2255/205* (2013.01); *B32B 2255/26* (2013.01); *B32B 2260/021* (2013.01); *B32B 2260/046* (2013.01); *B32B 2262/0261* (2013.01); *B32B 2262/0276* (2013.01); *B32B 2262/101* (2013.01); *B32B 2262/106* (2013.01); *B32B 2264/10* (2013.01); *B32B 2264/102* (2013.01); *B32B 2264/107* (2013.01); *B32B 2264/108* (2013.01); *B32B 2307/202* (2013.01); *B32B 2307/4026* (2013.01); *B32B 2307/54* (2013.01); *B32B 2307/718* (2013.01); *B32B 2307/7265* (2013.01); *B32B 2307/732* (2013.01); *B32B 2571/00* (2013.01); *B32B 2605/18* (2013.01)

SURFACING MATERIALS FOR COMPOSITE STRUCTURES

CROSS-REFERENCE TO RELATED APPLICATIONS

The present application is a continuation of U.S. application Ser. No. 15/778,035 filed on May 22, 2018, which is a U.S. national phase entry under 35 U.S.C. § 371 of International Application No. PCT/US2016/064002, filed on 29 Nov. 2016, which claims priority to U.S. provisional Application No. 62/260,824, filed on 30 Nov. 2015, the entire content of each of these prior filed applications is explicitly incorporated herein by reference.

In recent years, resin-impregnated, fiber-reinforced composite materials have been used for making aerospace structural parts such as aircraft wings and fuselage. The composite materials used in the fabrication of aerospace component parts must have certain characteristics to protect the parts from damage or hazards caused by common environmental occurrences such as lightning strikes, rain, snow and humidity. Lightning strikes can severely damage and/or punch through component parts if such parts are not adequately conductive and grounded throughout the aircraft. Fluid and moisture ingression into composite sandwich panels containing honeycomb or foam core is a common problem. Thus, it is desirable that such component parts are manufactured to have characteristics which, among other characteristics, prevent or alleviate damages caused by lightning strikes and fluid ingression.

DETAILED DESCRIPTION

Figure 1:
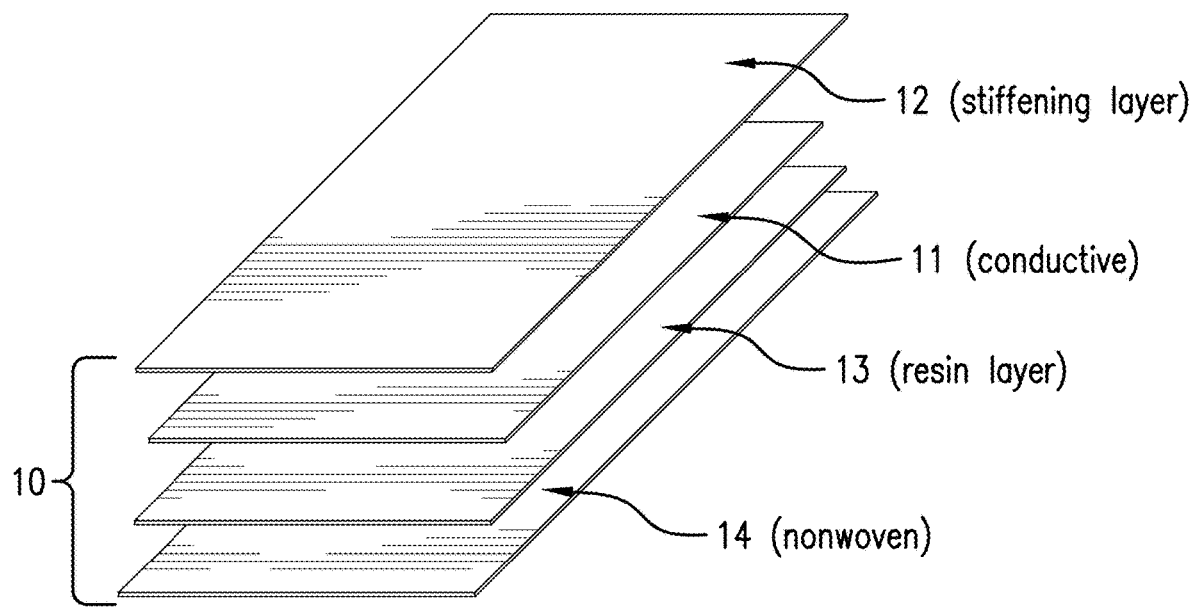
FIG. 1 schematically shows the components of an integrated conductive surfacing material according to one embodiment.

To minimize the damage of lightning strike on a composite structure, there is a need for enhancing the electrical conductivity of the composite structure to provide lightning strike protection (LSP) for aerospace composite parts. It is not desirable, however, to incorporate conductive material that will significantly increase the overall weight of the aircraft.

One aspect of the present disclosure is pertaining to an integrated electrically conductive surfacing material that is capable of providing lightning strike protection. This surfacing material can be applied onto an outer surface of a composite structure, e.g. an aircraft composite part, as a protective material.

The conductive surfacing material may be in the form of a flexible tape, which his lightweight and is configured for an automated placement process such as Automated Tape Laying (ATL) or Automated Fiber Placement (AFP). Due to its flexibility and lightweight property, the surfacing tape can be laid down at a significantly faster rate as compared to conventional resin-impregnated prepreg tapes. The surfacing tape may have a width of about 0.125 in to about 12 in (or about 3.17 mm to about 305 mm). In one embodiment, the surfacing tape has a width of about 0.125 in to about 1.5 in (or about 3.17 mm to about 38.1 mm), including about 0.25 in to about 0.50 in (or about 6.35 mm to about 12.77 mm). In another embodiment, the surfacing tape has a width of about 6 in to about 12 in (or about 152 mm to about 305 mm). The length of the tape is continuous or is very long relative to its width, for example, 100-100,000 times its width. In continuous form, the surfacing tape can be wound up into a roll for storage before its application in an automated process.

ATL and AFP are processes that use computer-guided robotics to lay down continuous tapes onto a mold surface (e.g., a mandrel) to build up a composite structure or fibrous preform. The ATL/AFP process involves dispensing one or more tapes side by side onto a mandrel surface to create a layer of desired width and length, and then additional layers are built up onto a prior layer to provide a layup with a desired thickness. The subsequent tapes may be oriented at different angles relative to prior tapes. The ATL/AFP system is equipped with means for dispensing and compacting the tapes directly onto the mandrel surface.

AFP can automatically lay down multiple individual tows (or very narrow slit tapes) (e.g., 0.125 in-1.5 in) onto a mandrel to make up a given total bandwidth. The material placement is done at high speed, using a numerically controlled placement head to dispense, clamp, cut and restart each tow during placement. ATL machine can lay down resin-impregnated tapes or continuous strips of fabric, which are wider than the tows used in AFP. Typically, with both processes, material is applied via a robotically controlled head, which contains mechanism needed for material placement. AFP is traditionally used on very complex surfaces.

According to one embodiment, which is schematically illustrated by FIG. 1, the conductive surfacing material is an integrated structure, which comprises a very thin conductive layer 11 sandwiched between a stiffening layer 12 and a curable resin layer 13, and a nonwoven layer 14 in contact with the curable resin layer 13. When the surfacing material is applied onto a composite substrate, the stiffening layer 12 is in contact with the composite substrate such that the nonwoven layer 14 is the outermost layer on the composite substrate after placement of the surfacing material. The outer surfaces of the stiffening layer 12 and the nonwoven layer 14 are substantially or completely tack-free.

The conductive layer may be a nonporous, continuous layer of metal or non-metallic conductive material with a thickness of less than about 102 μm, in some embodiments, in the range of about 5 μm to about 75 μm, or about 3 μm to about 5 μm. Alternatively, the conductive layer may be a porous layer, for example, a screen with an areal weight within the range of about 60 gsm to about 350 gsm, in some embodiments, about 60 gsm to about 195 gsm. Also, the porous conductive layer may have a thickness within the range of about 50 μm to about 102 μm (or 2-4 mils). "gsm" refers to g/m$^2$. When the conductive layer is a metal layer, the metal may be selected from copper, aluminum, bronze, titanium, and alloys thereof. In some embodiments, the porous conductive layer is a metal screen or an expanded metal foil. In other embodiments, the conductive layer is formed of a non-metallic material with intrinsic electrical conductivity such as carbon in sheet form, including graphene sheet and carbon-nanotube (CNT) paper. A specific example of CNT paper is flexible CNT Bucky paper.

The curable resin layer 13 may have an areal weight of less about 500 gsm, for example, about 50 gsm to about 150 gsm. It is free of any reinforcement fibers such as carbon fibers. The composition of the curable resin layer is discussed in greater detail below.

When conductive surfacing material is in the form of continuous or elongated tape, the entire tape may have a total areal weight of about 270 gsm to about 380 gsm. The total thickness of the tape may be in the range of about 76 μm to about 229 μm (or 3 to 9 mils).

The stiffening layer 12 provides strength, stiffness and support to the surfacing tape during the automated placement, and prevents the "accordion" effect when the surfacing material in the form of narrow-width tapes (or slit tows) is laid down by automated placement. The "accordion" effect refers to the wrinkling and bunching of the tape (or slit tow) during automated placement, as in AFP or ATL process.

The nonwoven layer 14 is applied to the exposed surface of the curable resin layer 13 in order to inhibit the curable resin layer, which is tacky, from sticking to other surfaces prior to the intended use of the surfacing material. But the curable resin layer 13 does not penetrate through the thickness the nonwoven layer 14. The nonwoven layer 14 is a nonwoven sheet of randomly oriented fibers, and can be fabricated by a conventional wet-laid process. The fibers of the nonwoven layer 14 may be polymeric fibers, such as polyester and polyamide fibers, or inorganic fibers such as glass fibers and carbon fibers. Also contemplated is a nonwoven layer of metal-coated fibers, such as metal-coated carbon fibers, metal-coated polyester fibers, metal-coated glass fibers, and metal-coated polyamide fibers. The metal coating on the fibers may be any metal including Copper, Nickel, Silver, and combination thereof. The nonwoven layer 14 may have an areal weight of about 10 gsm to about 50 gsm, in some embodiments, about 10 gsm to about 22 gsm.

In another embodiment, the nonwoven layer 14 is a layer of uncoated fibers, e.g. polymeric fibers or carbon fibers, coated with a thin metal coating on one or both surfaces after the nonwoven layer has been formed. For example, the nonwoven layer 14 may be a nonwoven sheet of carbon fibers or polyester fibers with a thin metal coating (e.g., Copper, Nickel, Silver, or combination thereof) deposited on the surface that is not in contact with the curable layer 13. The areal weight of the metal coating may be in the range of about 1 gsm to about 25 gsm (or about 10% to about 50% by weight of the metal-coated nonwoven layer).

Embodiments with Thermoplastic Layer

In one embodiment, the stiffening layer is a continuous, nonporous thermoplastic layer which can also serve as a fluid barrier, and can improve the damage-tolerance of composite structures. The thermoplastic layer may have a thickness of about 50 μm to about 153 μm (or about 2 to about 6 mils), particularly when the surfacing material is in the form of continuous or elongated tapes for automated placement. But higher thickness is possible depending on the application of the surfacing material. In this embodiment, the thermoplastic layer does not contain any reinforcement fibers, and the integrated surfacing material also does not include any additional layer of reinforcement fibers such as carbon fibers.

The thermoplastic layer is characterized by the following structural properties: a tensile modulus of from about 640 MPa (or 93 ksi) to about 2.1 GPa (or 305 ksi), as measured by ASTM D-882; a tensile strength at yield of from about 27 MPa (or 4 ksi) to about 76 MPa (or 11 ksi), as measured by ASTM D-882, a tensile strength at break of from about 41 MPa (or 5.9 ksi) to about 110 MPa (or 16 ksi), as measured by ASTM D-882; and an elongation at yield or break of from about 4% to about 10%, as measured by ASTM D-882, all properties being determined at about 23° C. Moreover, the thermoplastic layer is not tacky at room temperature (20° C. to 25° C.), meaning that it is dry (i.e., not sticky) to the touch.

In one embodiment, the thermoplastic layer is formed of a semi-crystalline thermoplastic polymer that has a melting temperature ($T_m$) greater than 280° C., more specifically, 280° C. to 360° C., as measured by Differential Scanning calorimetry (DSC) at a ramp rate of 10° C./minute. A particularly suitable class of polymers is polyaryletherketone (PAEK).

PAEK polymers are polymers containing the unit —Ar—O—Ar—C(=O)—, where each Ar is independently an aromatic moiety. Specific examples of PAEK polymers include poly (ether ketone) ("PEK"), poly (ether ether ketone) ("PEEK"), poly (ether ketone ketone) ("PEKK"), poly (ether ketone ether ketone ketone) ("PEKEKK"), poly (ether ether ketone ether ether ketone) ("PEEKEEK"), poly (ether diphenyl ketone) ("PEDK"), poly (ether diphenyl ether ketone) ("PEDEK"), poly (ether diphenyl ether ketone ketone) ("PEDEKK"), and poly (ether ketone ether naphthalene) ("PEKEN"). Commercially available PAEK polymers include APC-2® PEEK, CYPEK®-DSM or DSE or FC, and CYPEK®-HTE, which are all commercially available from Cytec Industries Inc.

Other thermoplastic polymers may be used for forming the thermoplastic layer provided that these polymers have the tensile modulus, tensile strength and elongation discussed above. Other suitable thermoplastic polymers include polyimide (e.g. Kapton® HN, and VN type polyimide film from Dupont), polyetherimide (e.g. Ultem™ 1000B PEI film from SABIC), polyamide-imide (e.g. Torlon® 4000TF from Solvay), polyamide (e.g. Stanyl® high-performance polyamide 46 film from DSM), polyester (e.g. Mylar® Polyethylene terephthalate polyester (PET, PETP) films from Valox), polysulfone (e.g. PSU Udel® film from CS Hyde Company) and combinations thereof.

Embodiments with Glassy Resins

In another embodiment, the surfacing material comprises the components shown in FIG. 1, wherein the stiffening layer 12 is composed of a woven fabric or nonwoven veil that has been coated or infused with a curable composition containing glassy thermoset resin(s).

The glassy thermoset resin refers a solid and brittle material at room temperature (20° C. to 25° C.). Moreover, the woven fabric or nonwoven veil coated/infused with the glassy resin composition has minimum or no tackiness at room temperature (20° C. to 25° C.), meaning that it is substantially or completely dry (i.e., not sticky) to the touch.

Particularly suitable are Epoxy Cresol Novolacs represented by the following formula:

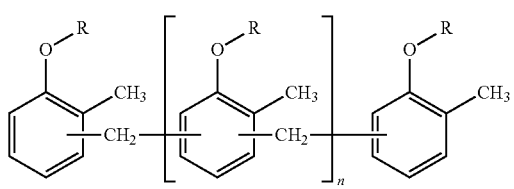

where

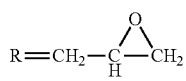

n=1 to 6

Examples of commercially available Epoxy Cresol Novolacs include Araldite® ECN 1273, 1280, 1299, 9511 from Ciba Specialty Chemicals.

Other suitable glassy thermoset resins are low moisture, hydrocarbon epoxy novolac resins with dicyclopentdiene (DCPD) backbone represented by the following formula:

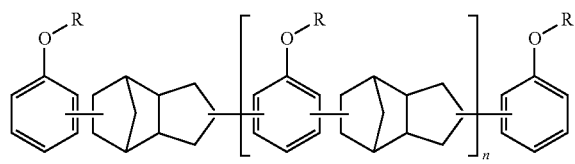

where

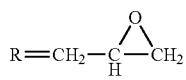

n=1 to 3

Examples of commercially available DPCD based epoxy Novolacs include Tactix® 556, and Tactix® 756 from Huntsman;

Also suitable are solid epoxy adducts, which are solid reaction products (or condensation products) of epichlorohydrin and bisphenol A and are represented by the following formula:

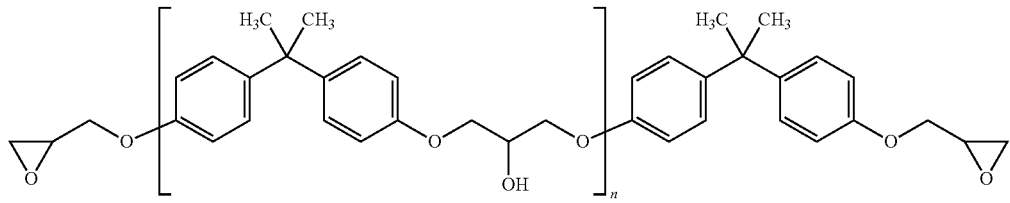

where n=2 to 7.

These solid epoxy adducts may have an Epoxide Equivalent Weight (g/eq) of about 500 to about 930, for example, 500-560 or 860-930, as determined by ASTM D-1652. These materials are solid at room temperature (20° C.-25° C.) and have a softening temperature above 60° C. In some embodiments, the epoxy adduct may have a softening temperature of about 65° C. to about 140° C., for example, 75° C.-85° C. or 100° C.-110° C., as determined by ASTM D-3104. Specific commercially available examples of such solid epoxy adducts are D.E.R.™ 661 and D.E.R.™ 664 from Dow Chemical Co.

The woven fabric that can be coated or infused with the glassy resin composition is a light-weight, woven fabric composed of continuous fibers, such as glass fibers, particularly, E-glass fibers, having an areal weight within the range of about 10 gsm to about 50 gsm. E-glass is aluminoborosilicate glass with less than 1% by weight alkali oxides. Aside from glass fibers, other suitable fibers include carbon fibers, thermoplastic fibers such as polyamide fibers and polyester fibers. Also contemplated are metal-coated fibers or metallic fibers. Examples of metal-coated fibers include metal-coated carbon fibers, metal-coated polyester fibers, metal-coated glass fibers, and metal-coated polyamide fibers. Metal coating on the fibers may be copper, nickel, silver, copper-silver, and combination thereof. The woven fibers may have diameters within the range of about 10 μm to about 15 μm (microns).

The nonwoven veil suitable for the purpose herein is a lightweight, highly porous non-woven material composed of chopped fibers, which are randomly oriented and held together by a small amount of binder, such as PVA (poly vinyl alcohol). The fibers of the veil may be polymeric fibers, inorganic fibers, or metal-coated fibers as described for the nonwoven layer 14. Like the nonwoven layer 14, the nonwoven veil can be fabricated by a conventional wet-laid process. The fibers may have lengths within the range of about 10 mm to about 15 mm and diameters within the range of 10 μm to 15 μm. In preferred embodiments, the nonwoven veil has an areal weight within the range of about 10 gsm to about 50 gsm, in some embodiments, about 10 gsm to about 35 gsm.

In one embodiment, one or more thermoset resins disclosed above (epoxy cresol novolac, DCPD-backbone epoxy novolac, or solid epoxy adduct) is/are mixed with a curing agent, an organic solvent, and optionally, a flow control agent, to form a coating solution containing about 65% to about 75% solids by weight. The coating solution may further include a minor amount of a thermoplastic polymer. The components may be blended in a shear mixer at room temperature until a substantially homogeneous blend is formed. When solid epoxy adduct is used, the epoxy adduct is optionally further milled into fine powder prior to mixing with the other components. The resulting resin solution is then coated onto both sides of a glass fabric or veil, following by drying.

Suitable curing agents for the epoxy novolacs and epoxy adducts may be selected from amine curing agents, e.g., dicyandiamide (DICY), 4,4'-diaminodiphenylsulfone (4,4'DDS), and 3,3'-diaminodiphenylsulfone (3,3'DDS), guanamine, guanidine, aminoguanidine, piperidine, and non-amine curing agents such as boron trifluoride ($BF_3$) or complexes thereof, and acid anhydrides. In an embodiment, the curing agent is dicyandiamide. The ratio of resin to curing agent in the coating solution is such that there are about 5 parts to about 30 parts of curing agent per 100 parts of glassy resin(s) by weight.

Suitable organic solvents include, but are not limited to, methyl ethyl ketone (MEK), Acetone, Toluene, PMA, Chloroform, Toluene-MIBK, Ethylene Chloride, and Xylene-MIBK. The epoxy cresol novolacs, DCPD-backbone epoxy novolac, and solid epoxy adduct disclosed herein are soluble in such solvents.

Suitable flow control agents include inorganic fillers in particulate form (e.g. powder). Such flow control agent is added to the coating solution as a rheology modifying component to control the flow of the resinous composition and to prevent agglomeration therein. Suitable inorganic fillers that may be used in the resin coating composition include talc, mica, calcium carbonate, alumina, and fumed silica. In one embodiment, hydrophobic fumed silica powder (e.g. Cab-O-Sil® TS-720 from Cabot Corporation) is used as the flow control agent. The amount of flow control agent may be within the range of about 1 part to about 5 parts by weight based on 100 parts of the glassy thermoset resin(s). A flow control agent in particulate form, such as fumed silica powder, is particularly suitable.

The thermoplastic polymer may be selected from polyarylsulphones such as polyether sulfone (PES), polyether ether sulfone (PEES), and a copolymer of PES and PEES, polyetherimide (PEI) (e.g. Ultem™ from General Electric). The amount of thermoplastic polymer may be about 1 part to about 20 parts per 100 parts of thermoset resin(s).

The glassy resin composition may further include a minor amount (less than 20 parts per 100 parts of glassy thermoset resin) of bismaleimide or BMI, e.g., Matrimid® 5292A from Huntsman, in powder form as a toughening agent.

Table 1 discloses some exemplary solvent-based resin formulations for coating woven fabric or nonwoven veil.

TABLE 1

| Examples | Resin (100 parts) | Other Components | Solid content (% solids) |
|---|---|---|---|
| A | Epoxy Cresol Novolacs (ECN) or DCPD-based epoxy novelacs (e.g. Tactix 71756) or Solid Epoxy adduct (e.g. DER 661, DER 664) | Organic solvent: 50 parts Curing agent: 5-30 parts Flow control agent: 5 parts | 65%-75% |
| B | Solid Epoxy adduct (e.g. DER 661, and/or DER 664) | Thermoplastic polymer: 5 parts Organic solvent: 50 parts Curing agent: 5-30 parts Flow control agent: 5 parts | 65%-75% |

In an alternative embodiment, the glassy thermoset resin (epoxy cresol novolac, DCPD-based epoxy novelacs or epoxy adduct) is blended with a curing agent, and optionally, a flow control agent and/or a thermoplastic polymer, without using solvent to form a molten mixture. The blending of the components is carried out in a mixer with heating/cooling and vacuum capacity to blend the resin mixture components uniformly. The molten mixture is then used to form a solid resin layer, for example, by hot-melt film coating onto a carrier layer (glass fabric or veil carrier) or release paper, followed by cooling to solidify the resin. The solid resin layer is then brought into contact with a woven fabric or nonwoven veil. Heat and pressure are applied to melt the resin layer and to infuse the fabric or veil with the molten resin. One resin layer may be pressed against one side of the fabric/veil or two resin layers may be pressed against opposite sides of the fabric/veil.

Embodiments with Glass Veils/Fabric and Nonwoven Layer

Figure 2:
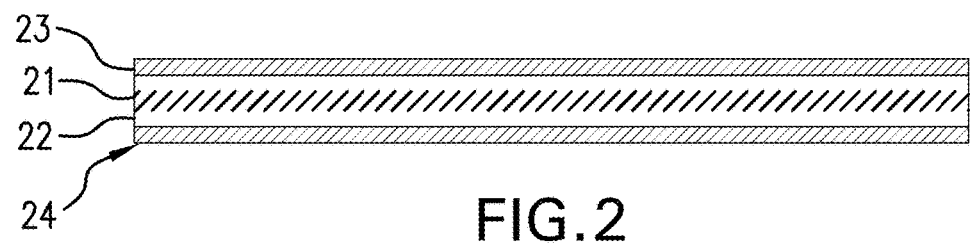
FIG. 2 schematically shows the cross-section of an integrated conductive surfacing material according to another embodiment.

In yet another embodiment, depicted by FIG. 2, the integrated surfacing material is a surfacing material comprising a porous conductive layer 21 embedded in a curable resin layer 22, an outer woven fabric or nonwoven veil 23 (hereafter "fibrous layer"), and an outer nonwoven layer 24. The outer surfaces of the fibrous layer 23 and the nonwoven layer 24 are substantially or completely tack-free. And the curable resin 22 does not penetrate through the thickness of either the fibrous layer 23 or nonwoven layer 24. When this surfacing material is placed on a composite substrate, the fibrous layer 23 is in contact with the composite substrate to provide stiffness and the nonwoven layer 24 becomes the outermost layer of the composite part. The porous conductive layer 21 is as described previously in reference to FIG. 1. In one embodiment, the porous conductive layer is a metal screen. The woven fabric or nonwoven veil 23 is as described previously for other embodiments. The nonwoven layer 24 is as described previously in reference to the nonwoven layer 14 in FIG. 1. In one embodiment, the layers 23 and 24 are nonwoven veils with the same or different areal weights. When the layers 23 and 24 are nonwoven veils with different areal weights, the nonwoven veil with the higher areal weight will be in contact with the composite substrate and the nonwoven veil with the lower areal weight will be the outermost layer in the final composite part after the surfacing material has been applied. This surfacing material may be in the form of a narrow-width tape for automated placement such as ATL or AFP as described previously.

The integrated surfacing material of FIG. 2 may be fabricated by, first, forming a curable resin layer onto a removable carrier layer, e.g., a release paper. A porous conductive sheet, e.g. a metal screen, is placed on the exposed surface of the curable resin layer, then heat and pressure are applied to the assembled layers so as to embed the porous conductive sheet into the resin layer. Subsequently, each of the fibrous layer 23 and the nonwoven layer 24 is separately laminated onto an opposite side of the resulting resin layer. Pressure is applied to bond the fibrous layer 23 and the nonwoven layer 24 to the resin layer but is not high enough to cause substantial or full penetration of the resin into either the fibrous layer 23 or the nonwoven layer 24.

Fluid Barrier

Another aspect of the present disclosure is pertaining to a surfacing material which functions as an outer fluid barrier in a composite structure. Such fluid barrier is particularly useful for a composite sandwich panel containing a porous core. Composite sandwich panels typically have composite skins co-cured with adhesives to the core through autoclave processing. The core material may take a variety of forms, such as a lightweight honeycomb, rigid foam, paper or wood. Preferably, the core is a honeycomb material as this provides excellent structural properties for a very low weight of material. Composite sandwich panels find widespread use in aerospace structural components because of the high stiffness-to-weight and strength-to-weight ratios.

Figure 3:
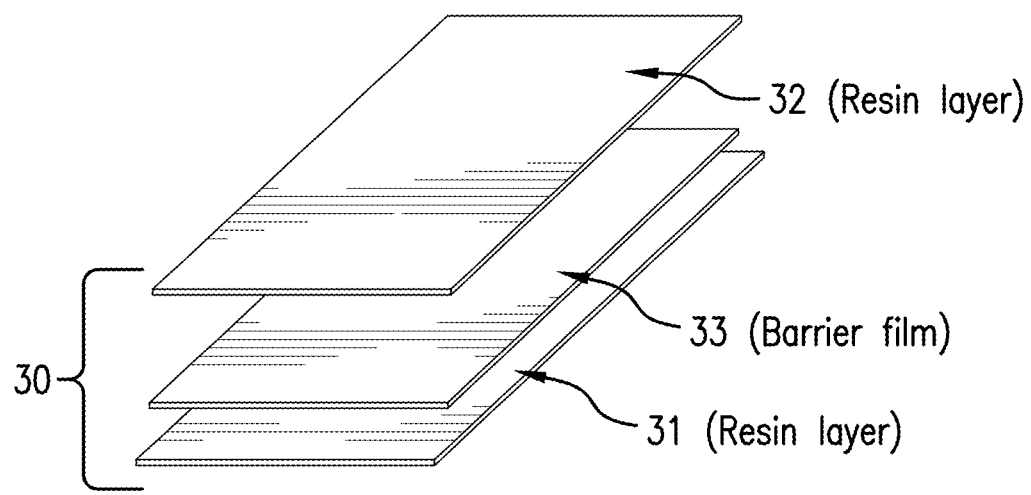
FIG. 3 schematically shows the components of a fluid-barrier surfacing material according another embodiment.

FIG. 3 illustrates an embodiment of a fluid barrier surfacing material 30, which includes a first curable resin layer 31, a second curable resin layer 32, and a barrier film 33 sandwiched between the resin layers. The curable resin layers and the barrier film form an integrated structure. Each of the first and second resin layers contains one or more thermoset resins and a curing agent, and does not contain any reinforcement fibers.

In some embodiments, at least one of the first and second resin layers further comprises an inorganic filler in particulate form selected from: TiO2 powder, nano-sized silica, nano-sized clay, carbon, graphite, graphene, carbon nanotubes (CNT), and combinations thereof. The presence of such inorganic filler increases the hydrophobicity of the resin layers and provides synergy with the barrier film to eliminate any fluid ingression into the composite structure below the surfacing material.

The barrier film is formed of a polymeric material that is impermeable to liquid. Preferred properties for the polymeric material include high Tg, e.g., within 140° C.-170° C.), or 150° C.-162° C., as measured by DSC at a ramp rate of 10° C./minute according to ASTM D3418. Another preferred property is crystallinity of 3%-50%, including 10%-40%, or 20%-30%, as measured by DSC at a ramp rate of 10° C./minute according to ASTM D3418.

As examples, the barrier film may be made of a thermoplastic material selected from: polyaryletherketone (PAEK) polymers, polyamide, polyimide, polyetherimide (PEI), polyamide-imide, polyester and combinations thereof. In some embodiments, the composition of the barrier film contains a PAEK polymer selected from: poly (ether ketone) ("PEK"), poly (ether ether ketone) ("PEEK"), poly (ether ketone ketone) ("PEKK"), poly (ether ketone ether ketone ketone) ("PEKEKK"), poly (ether ether ketone ether ether ketone) ("PEEKEEK"), poly (ether diphenyl ketone) ("PEDK"), poly (ether diphenyl ether ketone) ("PEDEK"), poly (ether diphenyl ether ketone ketone) ("PEDEKK"), and poly (ether ketone ether naphthalene) ("PEKEN"), and combinations thereof.

Figure 4:
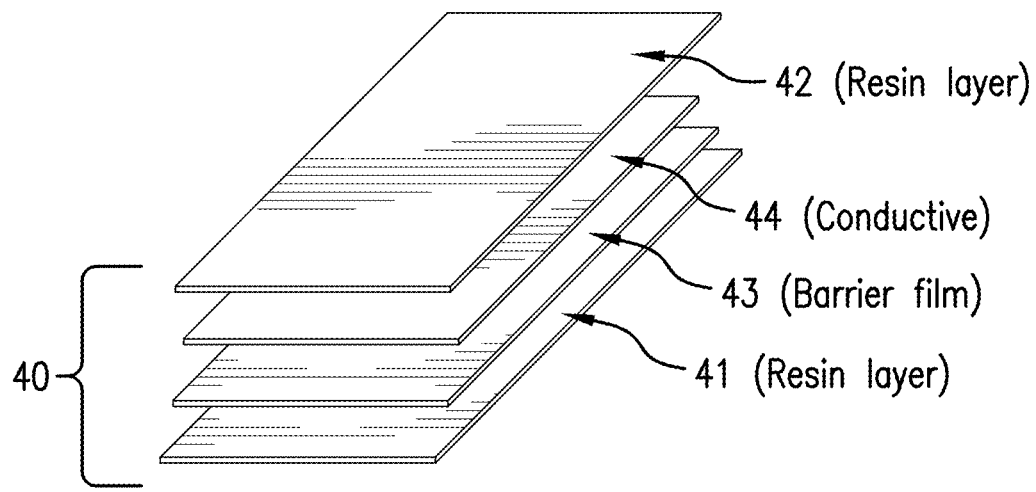
FIG. 4 schematically shows the components of a conductive fluid-barrier surfacing material according another embodiment.

FIG. 4 illustrates another embodiment of the fluid barrier surfacing material 40, which includes a first curable resin layer 41, a second curable resin layer 42, a barrier film 43, and a conductive layer 44. All four layers form an integrated structure. The barrier film 43 and conductive layer 44 are positioned between the two resin layers. The curable resin layers and barrier film are as described previously. The conductive layer 44 is as described above with reference to FIG. 1. In this embodiment, the surfacing material can provide LSP in addition to providing a fluid barrier.

Figure 5:
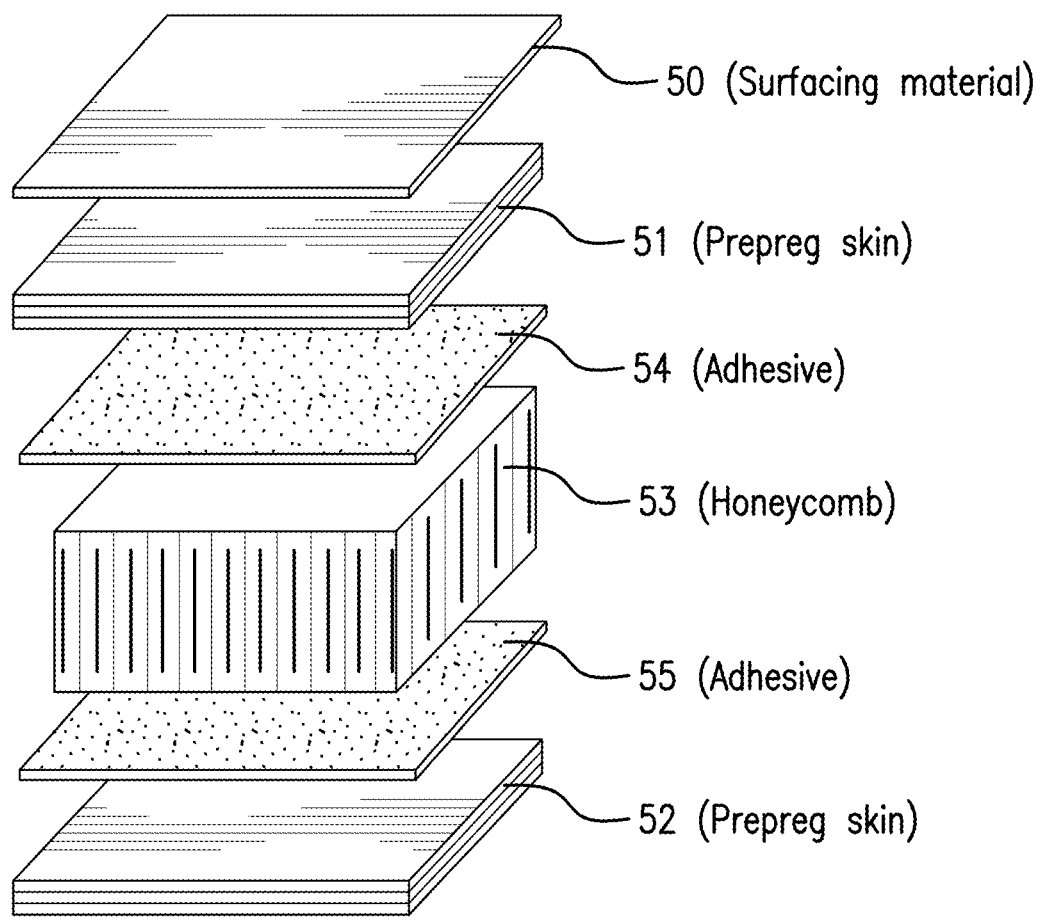
FIG. 5 schematically shows the components of a composite honeycomb sandwich structure panel with a fluid-barrier surfacing material.

FIG. 5 show the components of an exemplary composite sandwich panel having the fluid barrier surfacing material of FIG. 3 or FIG. 4 incorporated therein. As shown in FIG. 5, the composite sandwich panel includes a surfacing material (50), a first prepreg skin 51, a second prepreg skin 52, a honeycomb core 53, and adhesive films 54, 55 for bonding (via co-curing or secondary bonding) the prepreg skins to the honeycomb core. Each prepreg skin is composed of several curable prepreg plies.

The general method for producing the honeycomb sandwich panel includes laminating the honeycomb core with the prepreg skins and adhesive films on both sides, the fluid-barrier surfacing material on one of the skins, and co-curing all components to bond them to each other. Another way to fabricate the same honeycomb sandwich panel is through secondary bonding, such as in the case of panel repair. In this secondary bonding process, the pre-cured prepreg skins surface is treated with mechanical abrasion (e.g. sanding or grit blasting) or a removal peel ply to create a bond-ready surface. Then the pre-cured skins are bonded with honeycomb core via an adhesive film through a cure process. Then the fluid-barrier surfacing material is applied to an outer surface of the cured honeycomb sandwich panel followed by curing of the surfacing material so as to form a hardened, protective outer layer.

The adhesive for bonding the honeycomb core to the prepreg skins may be formed from a thermosettable composition containing one or more thermoset resins, e.g., epoxy resins, and a curing agent. For example, commercially available epoxy-based adhesives FM 309-1 and FM 300 from Cytec Engineered Materials Inc. may be used.

Curable Resin

The terms "cure" and "curing" as used herein refer to the irreversible hardening of a pre-polymer material or a resin precursor brought about by heating at elevated temperatures, exposure to ultraviolet light and radiation, or chemical additives. The term "curable" means possible to be cured into a hardened material. "Partially cured" as used herein refers to less than 100% degree of cure.

Each of the curable resin layer described in the various embodiments, particularly in reference to FIGS. 1-4, is formed from a thermosettable composition containing one or more thermoset resins and a curing agent.

Examples of suitable thermoset resins include, but are not limited to, epoxies, phenolic resins, cyanate esters, bismaleimides, benzoxazines (including polybenzoxazines), unsaturated polyesters, vinyl ester resins, and combinations thereof.

In some embodiments, the thermosettable composition contains one or more multifunctional epoxy resins. Multifunctional epoxy resin (or polyepoxide) contains two or more epoxy functional groups per molecule.

Examples of suitable multifunctional epoxy resins include the polyglycidyl ethers, which are prepared by reaction of epichlorohydrin or epibromohydrin with a polyphenol in the presence of alkali. Suitable polyphenols are, for example, resorcinol, pyrocatechol, hydroquinone, bisphenol A (bis(4-hydroxyphenyl)-2,2-propane), bisphenol F (bis(4-hydroxyphenyl) methane), bis(4-hydroxyphenyl)-1,1-isobutane, 4,4'-dihydroxybenzophenone, bis(4-hydroxyphenyl)-1,1-ethane, and 1,5-hydroxynaphthalene.

Also included are the polyglycidyl ethers of polyalcohols. Such polyalcohols include ethylene glycol, diethylene glycol, triethylene glycol, 1,2-propylene glycol, 1,4-butylene glycol, triethylene glycol, 1,5-pentanediol, 1,6-hexanediol, and trimethylolpropane.

Additional epoxy resins include polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other epoxides may include those derived from the epoxidation products of olefinically-unsaturated cycloaliphatic compounds or from natural oils and fats.

Also included are liquid epoxy resins which are reaction products of bisphenol A or bisphenol F and epichlorohydrin. These epoxy resins are liquid at room temperature and generally have epoxy equivalent weight (g/eq) of from about 150 to about 480 as determined by ASTM D-1652.

Particularly suitable are epoxy novolac resins which are polyglycidyl derivatives of phenol-formaldehyde novolacs or cresol-formaldehyde novolacs having the following chemical structure:

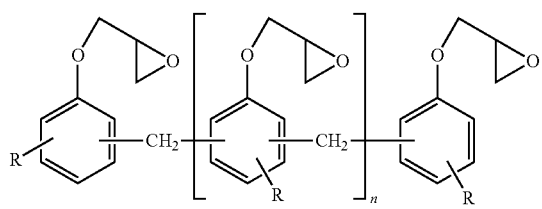

wherein n=0 to 5, and R═H or CH$_3$. When R═H, the resin is a phenol novolac resin. When R═CH$_3$, the resin is a cresol novolac resin. The former is commercially available as DEN 428, DEN 431, DEN 438, DEN 439, and DEN 485 from Dow Chemical Co. The latter is commercially available as ECN 1235, ECN 1273, and ECN 1299 from Ciba-Geigy Corp. Other suitable novolacs that may be used include SU-8 from Celanese Polymer Specialty Co. In a preferred embodiment, the epoxy novolac resin has a viscosity of 4000-10,000 mPa·s at 25° C. and epoxide equivalent weight (EEW) of about 190 g/eq to about 235 g/eq as determined by ASTM D-1652.

A particularly suitable multifunctional epoxy resin is a tetra-functional aromatic epoxy resin having four epoxy functional groups per molecule and at least one glycidyl amine group. An example is tetraglycidyl ether of methylene dianiline having the following general chemical structure:

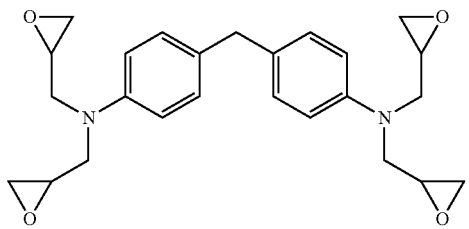 [SMILES: c1cc(N(CC2CO2)CC2CO2)ccc1Cc1ccc(N(CC2CO2)CC2CO2)cc1]

The amine groups in structure are shown in the para- or 4,4' positions of the aromatic ring structures, however, it should be understood that other isomers, such as 2,1', 2,3', 2,4', 3,3', 3,4', are possible alternatives. Examples of commercially available tetra-functional epoxy resins are Araldite® MY 9663, MY 9634, MY 9655, MY-721, MY-720, MY-725 supplied by Huntsman Advanced Materials.

Another particularly suitable multifunctional epoxy resin is tri-functional epoxy resin, for example, triglycidyl ether of aminophenol. Specific examples of commercially available tri-functional epoxy resins are Araldite® MY 0510, MY 0500, MY 0600, MY 0610 supplied by Huntsman Advanced Materials.

The curable resin composition may be formulated so as to yield high T$_g$ and high cross-linked density. In some embodiments, a combination of epoxy novolac resin(s) and non-novolac multifunctional epoxy resin(s) (particularly, tri-functional and/or tetra-functional epoxy) is used. The relative amounts of epoxy novolac resin and non-novolac multifunctional epoxy resin may be varied but it is preferred that the amount of epoxy novolac resin is with the range of about 80 to about 100 parts per 100 parts of non-novolac multifunctional epoxy resin. The combination of epoxy novolac resin and multifunctional epoxy resin at the specified proportion contribute to the desired high T$_g$ and cross-linked density upon curing.

The total amount of all resins makes up at least 15% by weight based on the total weight of the resin film composition. As an example, the total amount of resins may constitute about 30% to about 60% by weight based on the total weight of the thermosettable composition, or about 15% to about 25% by weight.

In some embodiments, the resin composition includes a combination of certain multifunctional thermoset resins, a polymeric toughening component to toughen the resin matrix, a latent amine-based curing agent, ceramic microspheres as a fluid barrier component, and particulate inorganic fillers as a rheology modifying component. The multifunctional resins and the ceramic microspheres make up more than 35% by weight of the total composition, preferably more than 45% by weight.

Polymeric Toughening Agents

The thermosettable composition may further include one or more polymeric toughening agents. The polymeric toughening agents may be selected the group consisting of: thermoplastic polymers, elastomers, core-shell rubber particles, a pre-react adduct which is a reaction product of an epoxy resin, a bisphenol, and an elastomeric polymer, and combinations thereof. In some embodiments, a combination of two different toughening agents from this group is used. The amount of toughening agent(s), in total, may be about 1% to about 30%, in some cases, about 10% to about 20% by weight based on the total weight of the composition. With regard to the pre-react adduct, suitable epoxy resins include diglycidylether of Bisphenol A, diglycidylether of tetrabromo Bisphenol A, hydrogenated diglycidyl ether of bisphenol A, or hydrogenated diglycidyl ether of bisphenol F. Also suitable are cycloaliphatic epoxies, which include compounds that contain at least one cycloaliphatic group and at least two oxirane rings per molecule. Specific examples include diepoxide of cycloaliphatic alcohol, hydrogenated Bisphenol A represented by the following structure:

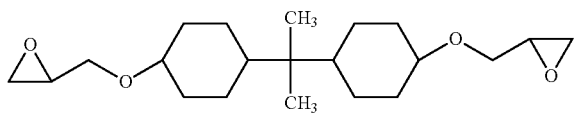

An example of such cycloaliphatic epoxy resin is EPAL-LOY® 5000 (a cycloaliphatic epoxy prepared by hydrogenating bisphenol A diglycidyl ether) available from CVC Thermoset Specialties. Other cycloaliphatic epoxides suitable for use in the pre-react adduct may include EPONEX cycloaliphatic epoxy resins, e.g. EPONEX Resin 1510 supplied by Momentive Specialty Chemicals.

The bisphenol in the pre-react adduct functions as a chain extension agent for the linear or cycloaliphatic epoxy. Suitable bisphenols include bisphenol A, tetrabromo bisphenol A (TBBA), Bisphenol Z, and tetramethyl Bisphenol A (TMBP-A).

Suitable elastomers for forming the pre-react adduct include, but are not limited to, liquid elastomers such as amine-terminated butadiene acrylonitrile (ATBN), carboxyl-terminated butadiene acrylonitrile (CTBN), and carboxyl-terminated butadiene (CTB). Also possible are fluorocarbon elastomers, silicone elastomers, styrene-butadiene polymers. In an embodiment, the elastomer used in the pre-react adduct is ATNB, CTBN or CTB.

In one embodiment, the epoxy resin is reacted with the bisphenol chain extension agent and the elastomer polymer in the presence of a catalyst, such as triphenyl phosphine (TPP), at about 300° F. (or 148.9° C.) to chain link the epoxy resins and to form a high viscosity, film-forming, high molecular-weight epoxy resin pre-react adduct. The pre-react adduct is then mixed with the remaining components of the thermosettable composition.

Suitable thermoplastic tougheners include polyarylsulfon polymers such as polyether sulfone (PES), polyether ether sulfone (PEES). In some embodiments, the toughening agent is a copolymer of PES and PEES, which is described in U.S. Pat. No. 7,084,213. In some embodiments, the toughener is poly(oxy-1,4-phenylenesulfonyl-1,4-phenylene), which has a $T_g$ of about 200° C. as measured by DSC.

The toughening component may be core-shell rubber (CSR) particles having particle size of 300 nm or less. The CSR particles may be any of the core-shell particles where a soft core is surrounded by a hard shell. Preferred CSR particles are those having a polybutadiene rubber core or butadiene-acrylonitrile rubber core and a polyacrylate shell. CSR particles having a hard core surrounded by a soft shell may also be used, however. The CSR particles may be supplied as a 25%-40% in weight percentage of CSR particles dispersed in a liquid epoxy resin. CSR particles having rubber cores and polyacrylate shells are available commercially from Kaneka Texas Corporation (Houston, Tex.) under the tradenames Kane Ace MX. It is preferred, but not required, that the core-shell rubber particles be added to the surfacing film composition as a suspension of particles in a suitable liquid epoxy resin. Kane Ace MX 411 is a suspension of 25% by weight core-shell rubber particles in MY 721 epoxy resin and is a suitable source of core-shell rubber particles. Kane Ace MX 120, MX 125, or MX 156, which contains 25-37% by weight of the same core-shell rubber particles dispersed in DER 331 resin, is also a suitable source of core-shell rubber particles. Other suitable source of core-shell rubber particles, such as MX 257, MX 215, MX217 and MX 451, may also be used. Another commercial source of core-shell rubber particles is Paraloid™ EXL-2691 from Dow Chemical Co. (methacrylate-butadiene-styrene CSR particles with average particle size of about 200 nm).

Curing Agents

The multifunctional epoxide resins may be cured by a variety of latent amine-based curing agents, which are activated at elevated temperatures (e.g. temperature above 150° F. (65° C.)). Examples of suitable curing agents include dicyandiamide (DICY), guanamine, guanidine, aminoguanidine, and derivatives thereof. Compounds in the class of imidazole and amine complexes may also be used. In an embodiment, the curing agent is dicyandiamide. The amine-based curing agent is present in an amount within the range of about 1% to about 5% by weight based on the total weight of the resin film composition.

A curing accelerator may be used in conjunction with the amine-based curing agent to promote the curing reaction between the epoxy resins and the amine-based curing agent. Suitable curing accelerators may include alkyl and aryl substituted ureas (including aromatic or alicyclic dimethyl urea), and bisureas based on toluenediamine or methylene dianiline. One example of bisurea is 4,4'-methylene bis (phenyl dimethyl urea), commercially available as Omicure U-52 or CA 152 from CVC Chemicals, which is a suitable accelerator for dicyandiamide. Another example is 2,4-toluene bis(dimethyl urea), commercially available as Omicure U-24 or CA 150 from CVC Chemicals. The curing accelerator may be present in an amount within the range of about 0.5% to about 3% by weight based on the total weight of the thermosettable composition.

Ceramic Microspheres

Ceramic microspheres may be added to the thermosettable composition to improve the surface smoothness of the resin film formed therefrom. They may be hollow or solid ceramic microspheres. In one embodiment, hollow, ceramic microspheres made of an inert silica-alumina ceramic material are used. The ceramic microspheres may have a crush strength of over 60,000 psi, a dielectric constant of about 3.7-4.6, a softening point in the range of 1000-1100° C. (or 1832-2012° F.), and particle diameters ranging from 0.1 micron to 50 microns, or 1-50 microns. The high softening point of the ceramic microspheres enables them to be nonabsorbent to solvents, non-flammable, and highly resistant to chemicals. Microspheres having diameters ranging from about 0.1 μm to about 20 μm, and preferably from about 1 μm to about 15 μm, have been found to be particularly suitable. An example of commercially available ceramic microspheres which are particularly suitable for use in the present resin film composition are sold by Zeelan Industries, Inc. under the trade name Zeeospheres®, for example, G-200, G210 and W-200. These are hollow, silica-alumina spheres with thick walls, odorless, and light gray in color. In a preferred embodiment, the combination of the multifunctional resins and ceramic microspheres makes up more than 50% by weight, preferably more than 60% by weight, of the resin film composition. In certain embodiments, the amount of ceramic microspheres is at least 20% by weight, based on the total weight of the resin film composition. In some embodiments, the amount of ceramic microspheres may be within the range of about 20% to about 40% by weight, or about 25% to about 35% by weight based on the total weight of the thermosettable composition. In other embodiments, the amount of ceramic microspheres may be within the range of about 3% to about 15% by weight, or about 5% to about 10% by weight.

Flow Control Agents

Inorganic fillers in particulate form (e.g. powder) are added to the thermosettable composition as a rheology modifying component to control the flow of the resinous composition and to prevent agglomeration therein. Suitable inorganic fillers that may be used in the resin film composition include talc, mica, calcium carbonate, alumina, and fumed silica. In one embodiment, hydrophobic fumed silica (e.g. Cab-O-Sil TS-720) is used as the inorganic filler. The amount of inorganic fillers may be within the range of about 1% to about 5% by weight based on the total weight of the thermosettable composition.

Optional Additives

The thermosettable composition may further include one or more optional additives which affect one or more of mechanical, electrical, optical, and thermal properties of the cured or uncured resin film. Such additives include, but are not limited to, ultraviolet (UV) stabilizers, pigments/dyes, and conductive materials. When such additives are used, their total amount is less than about 5% by weight based on the total weight of the thermosettable composition.

Examples of UV stabilizers that may be added to the resin composition include butylated hydroxytoluene (BHT); 2-hydroxy-4-methoxy-benzophenone (e.g. UV-9); 2,4-bis(2,4-dimethylphenyl)-6-(2-hydroxy-4-octyloxyphenyl)-1,3,5-triazine (e.g. CYASORB® UV-1164 light absorber); 3,5-di-tert-butyl-4-hydroxybenzoic acid; n-hexadecyl ester (e.g. CYASORB® UV-2908 light stabilizer); Pentaerythritol Tetrakis(3-(3,5-di-tert-butyl-4-hydroxyphenyl)propionate (e.g. IRGANOX 1010). Liquid hindered-amine light stabilizer from Ciba Specialty Chemicals, such as 2-(2H-benzotriazol-2-yl)-4,6-ditertpentylphenol (e.g. TINUVIN 328), Methyl 1,2,2,6,6-pentamethyl-4-piperidyl sebacate (e.g. TINUVIN 292). Decanedioic acid, bis(2,2,6,6-tetramethyl-1-(octyloxy)-4-piperidinyl ester (e.g. TINUVIN 123), may also be used as suitable UV stabilizers. In addition, nano-sized zinc oxide (n-ZnO), e.g. NanoSunGuard 3015, and titanium oxide nanoparticles (n-TiO2) may also be used as UV stabilizers.

Pigments and/or dyes known in the art for adding color to resinous systems may be added to the resin film composition. Examples of pigments and/or dyes include, but are not limited to, red iron oxide, green chromium, carbon black, and titanium oxide. In an embodiment, titanium oxide (white) pigment is added the resin film composition. In another embodiment, carbon black pigment is added.

Conductive materials in particulate form, e.g. particles or flakes, may also be added to the resin film composition to impart electrical conductivity to the final resin film. Examples of suitable conductive materials include metals such as silver, gold, nickel, copper, aluminum, bronze, and alloys thereof, in the form of flakes or particles. Carbon-based materials, such as carbon nano-tubes (single-wall nano tubes or multi-wall nano tubes), carbon nano-fibers, and graphene may also be used as conductive additives to impart the electrical conductivity to the resin film. The nano-fibers may have diameters ranging from 70 to 200 nanometers and a length of about 50-200 microns. The nano-tubes may have an outer diameter of about 10 nanometers, length of about 10,000 nanometers, and an aspect ratio (L/D) of about 1000. In addition, conductive additives may also include carbon black particles (such as Printex XE2 from DeGussa).

In one embodiment, the thermosettable composition for forming the curable resin layer or matrix has the following formulation, in weight percentages based on the total weight of the composition: 20%-25% epoxy phenol novolac resin; 20%-25% tetra-functional epoxy resin; 10%-15% pre-react adduct, 1%-3% PES-PEES copolymer, 25%-35% ceramic microspheres; 1%-5% latent amine-based curing agent; 0.5%-3% curing accelerator; 1%-3% inorganic fillers; and optionally 0.1-1% color pigment.

In another embodiment, the thermosettable composition has the following formulation, in weight percentages based on the total weight of the composition: 5%-15% epoxy phenol novolac resin; 5%-15% tetra-functional epoxy resin; 10%-20% pre-react adduct, 1%-3% PES-PEES copolymer, 25%-35% ceramic microspheres; 1%-5% latent amine-based curing agent; 0.5%-3% curing accelerator; 1%-3% inorganic fillers; and 45%-70% conductive additives, such as silver flakes or silver-copper flakes, or carbon-based nano-sized materials discussed above.

The components of the thermosettable composition may be added to a shear mixer equipped with mixing, heating, and/or cooling mechanisms. Furthermore, one or more organic solvents may also be added to the mixture, as necessary, to facilitate the mixing of the components. Examples of such solvents may include, but are not limited to, methyl ethyl ketone (MEK), acetone, dimethylacetamide, and N-methylpyrrolidone.

To facilitate the handling of the resin layer, the thermosettable composition is applied onto a removable carrier layer as described above to form a resin layer. The resin layer may be formed by using a hot-melt coating process if no solvent is used or a solution coating process if solvent is used. If solvent is used, subsequent drying of the resin layer will be necessary to remove volatiles.

Applications

The surfacing materials disclosed herein can be applied onto and co-cured with a fiber-reinforced, polymeric composite substrate at a temperature above 150° F. (65° C.), more particularly, within the range of 200° F. to 365° F. (or 93° C. to 185° C.). The fiber-reinforced, polymeric composite substrate is composed of reinforcement fibers which have been impregnated or infused with a curable matrix resin. In some embodiments, the composite substrate may be a prepreg ply or prepreg layup. The prepreg layup is composed of a plurality of prepreg plies arranged in a stacking sequence. Each prepreg ply is composed of reinforcement fibers in the form of a fabric or directionally aligned, continuous fibers that have been impregnated/infused with a matrix resin, e.g. epoxy resin. The directionally aligned fibers may be unidirectional or multi-directional fibers. In general, the curable conductive surfacing material may be applied onto a fiber-reinforced, polymeric composite substrate, which is in an uncured or partially cured state, followed by co-curing to form a fully-cured composite structure having a hardened surfacing film bonded thereto as the outermost layer.

In the form of continuous surfacing tape, the surfacing material can be laid down onto a composite substrate by automated placement such as ATL and AFP processes. The surfacing tape may be incorporated into an ATL/AFP process that automatically lays down continuous, resin-impregnated prepreg tapes to form the composite structure. Each prepreg tape is composed of unidirectional reinforcement fibers, e.g. carbon fibers, which are embedded in a curable resin matrix, e.g. epoxy-based matrix. In the automated placement process, individual prepreg tapes are laid down directly onto a mandrel or mold surface at high speed, using one or more numerically controlled placement heads to dispense, clamp, cut and restart each tape during placement. The prepreg tapes are dispensed side by side to create a layer of a desired width and length, and then additional layers are built onto a prior layer to provide a prepreg layup with a desired thickness. Then, surfacing tapes are laid down on the prepreg layup to form the outermost layer. Such ATL/AFP process is conventionally used for the manufacturing of large composite aerospace structures, such as fuselage sections or wing skins of aircrafts. This automated placement process eliminates some of the intermediate processing steps that are typical in the conventional methods of manually applying large surfacing films onto an existing prepreg layup.

For surfacing material with fluid-barrier property, the disclosed fluid-barrier surfacing material can be used to fabricate airplane structure parts (such as wing, fuselage, tail, and engine nacelle structure, etc.). The use of such multifunctional fluid-barrier surfacing material as an outer protective layer provides multifaceted benefits, including elimination of fluid ingression, good surfacing properties, and LSP at a significant cost saving.

EXAMPLES

The following examples serve to give specific embodiments of the surfacing materials according to the present disclosure but are not meant to limit the scope of the present disclosure in any way.

Example 1

PEKK in a pelletized form was fed into a single-crew extruder, which was heated to the required temperatures for melting the PEKK pellets as they travel through the extruder barrel. The melt material exiting the extruder entered a die to form a PEKK film, which was subsequently cooled.

Figure 6:
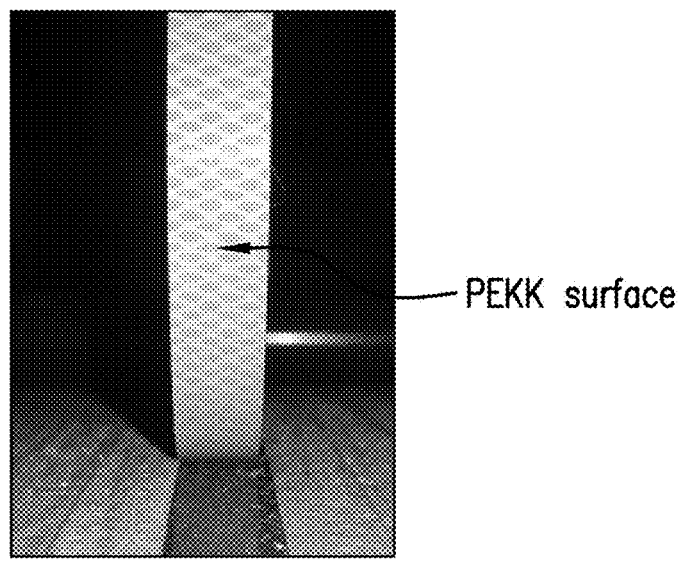
FIG. 6 is a photographic image of a surfacing tape that has been slit for Automated Fiber Placement (AFP) application, showing clean edges.
Figure 7:
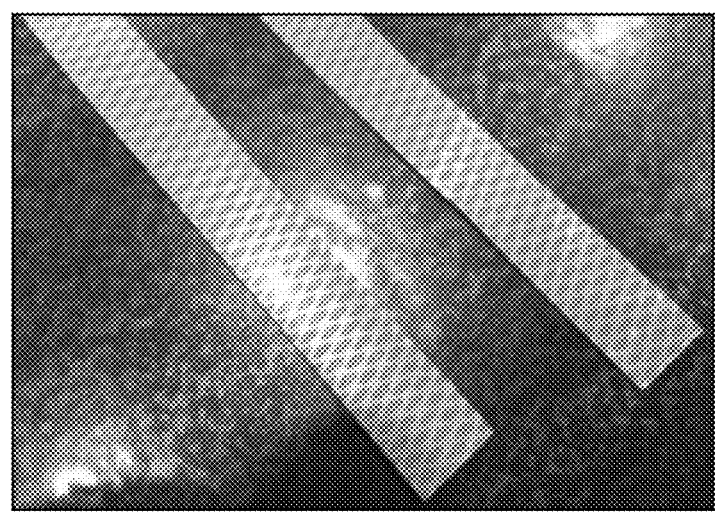
FIG. 7 is a photographic image of two AFP surfacing tapes with PEKK surfaces facing up.

The PEKK film was then laminated to a copper screen (73 gsm) and a curable SM 905 surfacing layer (90 gsm) from Cytec Industries Inc. with the copper screen sandwiched between the PEKK layer and the surfacing layer. A 12 gsm nonwoven polyester mat was laminated to the exposed surface of the surfacing film with application of heat and pressure, resulting in an integrated laminate structure. Lamination did not cause the resin of the surfacing layer to penetrate through the thickness of the nonwoven polyester mat. Also, the resulting laminate had outer surfaces that were tack-free. The laminate was then slit into narrow strips with a width of about 6.35 mm (or 0.25 in) which is suitable for an AFP process. FIG. 6 shows the newly slit tape with PEKK surface revealed. It was noted that the side edges of the slit tape were clean and there was no deformation of the copper screen during slitting. FIG. 7 is a photographic image of two AFP slit tapes with PEKK surfaces facing up.

Example 2

A coating resin solution was prepared according to the following formulation:
Solid Epoxy Adduct (DER 661), jet milled: 100 g
MEK solvent: 50 g
DICY: 15 g
Fumed silica (Cabosil TS 720): 5 g The components were mixed at room temperature (23° C.) in a high-speed shear mixer until a substantially homogeneous resin solution was formed. The solid content of this solution was approximately 70% solids by weight.

The resin solution was then coated onto both sides of glass fabric (108 Glass Fabric supplied by BGF Industries) at an areal weight of 48 gsm. The total areal weight of resin-coated glass fabric was approximately 100 gsm, and the thickness was about 102 µm (or 4 mils).

The resin-coated glass fabric was then combined with a copper screen (175 gsm), a curable SM 905 surfacing layer (90 gsm) from Cytec Industries Inc., and a 10 gsm nonwoven glass mat, wherein the copper screen is sandwiched between the resin-coated glass fabric and the surfacing layer, and the surfacing layer is into contact with the nonwoven glass mat. Heat and pressure were applied to the assembled layers to form an integrated laminate structure. But the resin of the surfacing layer did not penetrate through the thickness of the nonwoven polyester mat. The laminate was then slit into narrow strips with a width of 6.35 mm (or 0.25 in).

Example 3

A copper screen (175 gsm) was embedded into a curable SM 905 surfacing film (90 gsm) by applying heat and pressure. A nonwoven glass veil with an areal weight of 17 gsm (Optiveil® from Technical Fibre Products) was laminated to one side of the screen-containing resin layer, with application of heat and pressure, to bond the glass veil to the resin layer but the resin of the surfacing layer did not penetrate through the thickness of the glass veil, and then a 10 gsm glass veil (Optiveil® from Technical Fibre Products) was similarly bonded to the opposite side of the resin layer. The resulting laminate was slit into narrow strips with a width of 6.35 mm (or 0.25 in). The 10 gsm glass veil will be the outermost surface layer after the surfacing tape has been applied on a composite substrate, and the 17 gsm glass veil will be in contact with the composite substrate.

Example 4

A copper screen (175 gsm) was embedded into a curable SM 905 surfacing film (90 gsm) by applying heat and pressure. A non-woven carbon veil with an areal weight of 8 gsm (Optiveil® from Technical Fibre Products) was laminated to one side of the screen-containing resin layer, with application of heat and pressure, to bond the veil to the resin layer but the resin of the surfacing layer did not penetrate through the thickness of the veil, and then another 8 gsm carbon veil (Optiveil® from Technical Fibre Products) was similarly bonded to the opposite side of the resin layer. The resulting laminate was slit into narrow strips with a width of 6.35 mm (or 0.25 in). One of the carbon veils will be the outermost surface layer after the surfacing tape has been applied on a composite substrate, and the other will be in contact with the composite substrate.

Example 5

A copper screen (175 gsm) was embedded into a curable SM 905 surfacing film (90 gsm) by applying heat and pressure. A copper coated carbon veil (i.e., nonwoven copper-coated carbon fibers) with an areal weight of 12 gsm (Optiveil® from Technical Fibre Products) was laminated to one side of the screen-containing resin layer, with application of heat and pressure, to bond the veil to the resin layer but the resin of the surfacing layer did not penetrate through the thickness of the veil, and then another copper coated carbon veil, areal weight of 12 gsm (Optiveil® from Technical Fibre Products) was similarly bonded to the opposite side of the resin layer. The resulting laminate was slit into narrow strips with a width of 6.35 mm (or 0.25 in). One of the copper coated carbon veils will be the outermost surface layer after the surfacing tape has been applied on a composite substrate, and the other will be in contact with the composite substrate.

Terms, Definitions, and Abbreviations

In the present disclosure, the modifier "approximately" and 'about" used in connection with a quantity is inclusive of the stated value and has the meaning dictated by the context, (e.g., includes the degree of error associated with measurement of the particular quantity). For example, a number following "about" can mean the recited number plus or minus 0.1% to 1% of that recited number. The suffix "(s)" as used herein is intended to include both the singular and the plural of the term that it modifies, thereby including one or more of that term (e.g., the metal(s) includes one or more metals). Ranges disclosed herein are inclusive of the endpoints and all intermediate values of the ranges, for example, "1% to 10%" includes 1%, 1.5%, 2%, 2.5%, 3%, 3.5%, etc.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An integrated electrically conductive surfacing material comprising:
   (a) a stiffening layer;
   (b) a curable resin layer comprising one or more thermoset resins and a curing agent;
   (c) a conductive layer between the stiffening layer and the curable resin layer; and
   (d) a nonwoven layer laminated to the curable resin layer,
   wherein the stiffening layer (a) and the nonwoven layer (d) are outermost layers and the exposed surfaces of the outermost layers are substantially tack-free at room temperature (20° C. to 25° C.), and
   wherein the stiffening layer is a woven fabric or nonwoven veil that is infused or coated with a glassy resin composition comprising a curing agent and a thermoset resin selected from:
   (i) an Epoxy Cresol Novolac represented by the following formula:

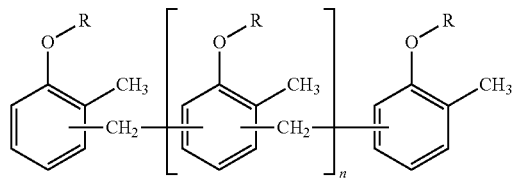

where

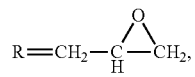

n=1 to 6;
   (ii) a hydrocarbon epoxy novolac resin with dicyclopentdiene (DCPD) backbone represented by the following formula:

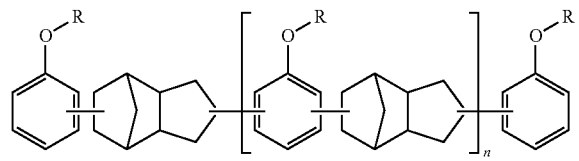

where

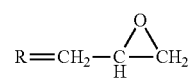

n=1 to 3; and
   (iii) a solid reaction product of epichlorohydrin and bisphenol A having the following formula:

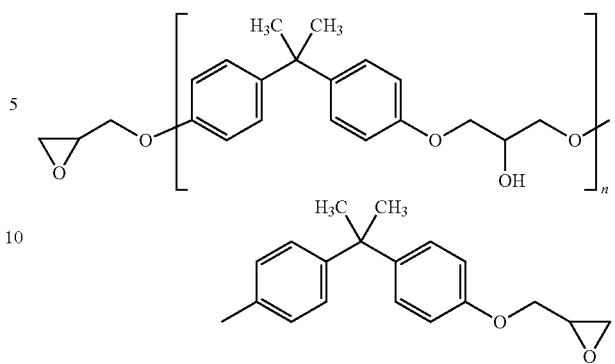

where n=2 to 7.

2. The electrically conductive surfacing material according to claim 1, wherein the curing agent for the glassy resin composition is selected from: amine curing agents, boron trifluoride ($BF_3$) and complexes thereof, acid anhydrides, and combination thereof.

3. The electrically conductive surfacing material according to claim 1, wherein the curing agent for the glassy resin composition is selected from: dicyandiamide (DICY), 4,4'-diaminodiphenylsulfone (4,4'DDS), 3,3'-diaminodiphenylsulfone (3,3'DDS), guanamine, guanidine, aminoguanidine, piperidine, and combinations thereof.

4. The electrically conductive surfacing material according claim 1, wherein the glassy resin composition further comprises a thermoplastic polymer selected from: polyether sulfone (PES) and polyether ether sulfone (PEES), a copolymer of PES and PEES, polyetherimide (PEI), and combination thereof.

5. The electrically conductive surfacing material according to claim 1, wherein the glassy resin composition further comprises a flow control agent selected from: talc, mica, calcium carbonate, alumina, fumed silica, and combination thereof.

6. The electrically conductive surfacing material according claim 1, wherein the stiffening layer comprises a nonwoven veil that is infused or coated with the curable resin composition, and the nonwoven veil comprises randomly oriented, chopped fibers, said fibers being selected from the group consisting of: polymeric fibers, inorganic fibers, metal-coated fibers, and combinations thereof.

7. The electrically conductive surfacing material of claim 6, wherein the fibers of the nonwoven veil are selected from the group consisting of: carbon fibers, metal-coated carbon fibers, metal-coated glass fibers, metal-coated polyester fibers, metal-coated polyamide fibers, and combinations thereof.

8. The electrically conductive surfacing material according to claim 1, wherein the nonwoven veil has an areal weight within the range of about 10 gsm to about 50 gsm.

9. The electrically conductive surfacing material according to claim 1, wherein the conductive layer is a porous or nonporous metallic layer of copper, aluminum, bronze, titanium, or alloys thereof.

10. The electrically conductive surfacing material according to claim 1, wherein the conductive layer is a metal screen or a nonporous metal foil.

11. The electrically conductive surfacing material according to claim 1, wherein the nonwoven layer (d) comprises randomly oriented fibers selected from the group consisting of: polymeric fibers, inorganic fibers, metal-coated fibers, and combinations thereof.

12. The electrically conductive surfacing material according to claim 1, wherein the nonwoven layer (d) further comprises a metal coating, which is not in contact with the curable resin layer (b).

13. The electrically conductive surfacing material according to claim 1, wherein the surfacing material is in the form of a continuous or elongated tape having a width in the range of about 0.125 in to about 12 in and a length that is at least ten (10) times its width.

14. A composite structure comprising:
- a composite substrate comprising reinforcement fibers impregnated with a curable matrix resin;
- the electrically conductive surfacing material according to claim 1 laminated to a surface of the composite substrate such that the stiffening layer is in contact with the composite substrate.

15. The composite structure of claim 14, wherein said composite substrate is a prepreg layup, which comprises a plurality of prepreg plies arranged in a stacking arrangement, each prepreg ply comprising unidirectional reinforcing fibers impregnated with or embedded in a curable matrix resin.

16. A method for forming a composite structure comprising:
- forming a composite substrate, which comprises reinforcement fibers impregnated with a curable matrix resin;
- dispensing a plurality of the electrically conductive surfacing material of claim 13, side by side, directly onto the composite substrate by an automated placement process to form a protective surfacing layer on the composite substrate, wherein the stiffening layer in the surfacing material is facing the composite substrate during automated placement; and
- co-curing the protective surfacing layer and the composite substrate.

17. The method of claim 16, wherein the composite substrate is formed by laying up prepreg tapes in an automated placement process, which includes dispensing and compacting prepreg tapes directly on a molding surface.

* * * * *